United States Patent [19]

Lewis

[11] Patent Number: 5,026,194
[45] Date of Patent: Jun. 25, 1991

[54] VARIABLE TIP PASTRY BAG

[76] Inventor: Elvin L. Lewis, 39933 Jasper-Lowell Rd., Lowell, Oreg. 97452

[21] Appl. No.: 579,738

[22] Filed: Sep. 10, 1990

[51] Int. Cl.⁵ .............................................. A23P 1/00
[52] U.S. Cl. .................................. 401/261; 222/567; 425/191
[58] Field of Search ..................... 222/566, 567, 568; 401/261, 265; 425/191

[56] References Cited

U.S. PATENT DOCUMENTS

| 1,657,299 | 1/1928 | Dagley | 425/191 |
| 3,138,821 | 6/1964 | Macciocchi et al. | 401/265 |
| 3,157,312 | 11/1964 | Kitterman | 222/541 X |
| 3,847,523 | 11/1974 | Parrish et al. | 222/568 X |

FOREIGN PATENT DOCUMENTS 1149931 7/1957 France .................. 222/566

Primary Examiner—Steven A. Bratlie
Attorney, Agent, or Firm—John F. Ingman

[57] ABSTRACT

A variable tip pastry bag includes a flexible, conical-shaped bag with an end opening formed by truncation of the bag proximate the apex of the cone. The surface of the bag further is split a distance longitudinally from the end of the opening so that the size of the opening is variable. The edges of the split are adjustably fastened relative to each other, thus varying the size of the opening. A flexible connecting strap extending from one edge of the split, having a first fastening surface of a hook and loop fastener on its inwardly facing surface, and a connecting strap receiver attached on the outside of the bag proximate the opposing edge of the split, which utilizes an outwardly facing second fastening surface of the hook and loop fastener, may be used for fastening the edges of the split. A flap member is attached to the inside surface of the pastry bag and is formed to extend inside of, and across, the split, so as to preclude loss of icing through the split.

4 Claims, 2 Drawing Sheets

VARIABLE TIP PASTRY BAG

BACKGROUND OF THE INVENTION

1. Field of the Invention

This invention involves a pastry bag, as used to hold and apply decorative icings to cakes and other pastries, and, more particularly, a pastry bag which is capable of receiving various sizes and designs of decorating tips during use.

2. Description of the Prior Art

Decorative icings long have been applied to cakes and other pastries through use of a pastry bag in the form of a flexible cone, filled with icing, and a hollow nozzle-like decorating tip which fits into and protrudes through an opening in the small end of the cone. However, since a variety of sizes and shapes of decorating tips may be used to vary the design of the icing applied, the practice of placing a selected decorating tip within the conventional pastry bag is generally unsatisfactory since the decorating tip may not be changed without first substantially emptying the pastry bag of icing material.

U.S. Pat. No. 299,228 partially solved this problem by providing a tubular socket installed within the pastry bag and extending outward therefrom, with a threaded collar engaging the socket and holding a flanged and conically tapering second socket between flanges of the tubular socket and collar, which second socket, in turn, holds the decorating tip.

Other more recent designs, such as those disclosed in U.S. Pat. No. 3,847,523 utilize a conical shaped tubular element within the pastry bag having a threaded end extending from the bag, with the decorating tip supported by a coupler threaded to the tubular element. Various configurations of tubular elements and couplers allow interchangeability of the same-sized decorative tips of different icing design, and, with a second conical tubular element threadingly coupled to the first tubular element, it is possible for a second and smaller coupler to hold a smaller decorative tip.

However, the use of a plethora of tubular elements and couplers and their necessary cleaning and storage, combined with the increase in pressure necessary on the pastry bag to force the icing past the restrictive openings of the tubular elements and couplers, indicate the need for an improved pastry bag which does not utilize tubular elements and connectors, yet permits the simple and ready replacement of decorating tips of both various sizes and designs.

SUMMARY OF THE INVENTION

The present invention provides a variable tip pastry bag which meets the aforementioned need. A flexible, conical-shaped bag is provided with an end opening formed by truncation of the bag proximate the apex of the cone. The surface of the bag further is split a distance longitudinally from the end of the opening so that the size of the opening is variable. Means for adjustably fastening the edges of the split relative to each other, and thus varying the size of the opening, are provided, which in the preferred embodiment include a flexible connecting strap extending from one edge of the split and having a first fastening surface of a hook and loop fastening means on its inwardly facing surface, and a connecting strap receiving means, attached on the outside of the bag proximate the opposing edge of the split, which utilizes an outwardly facing second fastening surface of the hook and loop fastening means. A flap member is attached to the inside surface of the pastry bag and is formed to extend inside of, and across, the split, so as to preclude loss of icing through the split.

DESCRIPTION OF THE PREFERRED EMBODIMENT

Figure 1:
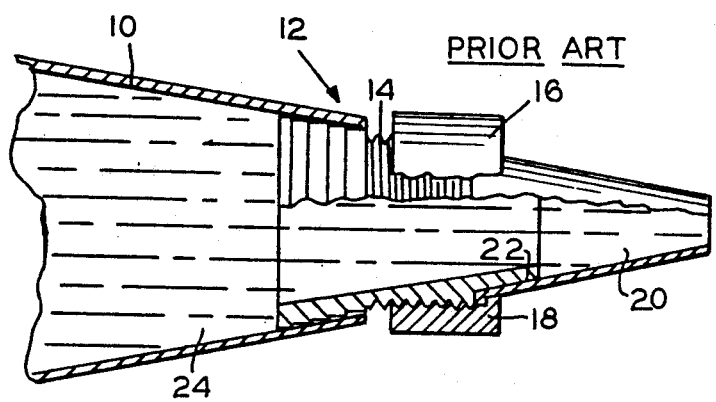
FIG. 1 provides a partially sectioned view of a prior art pastry bag utilizing a tubular element and threaded coupler to retain the decorating tip.
Figure 2:
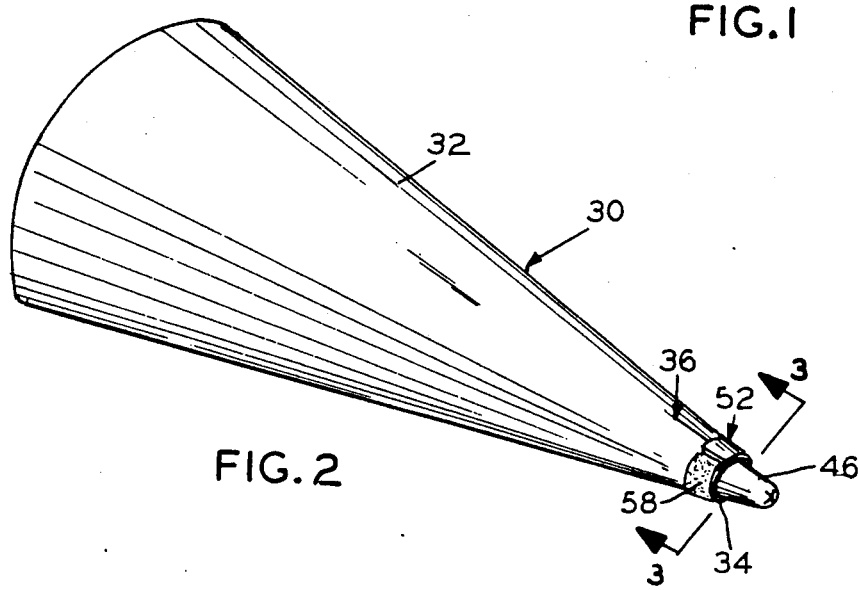
FIG. 2 illustrates a perspective view of a pastry bag of the present invention.
Figure 3:
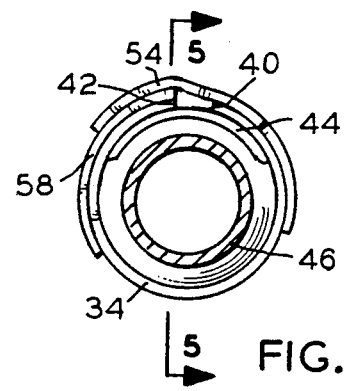
FIG. 3 illustrates a cross-sectional end view as seen at line 3—3 of FIG. 2.
Figure 4:
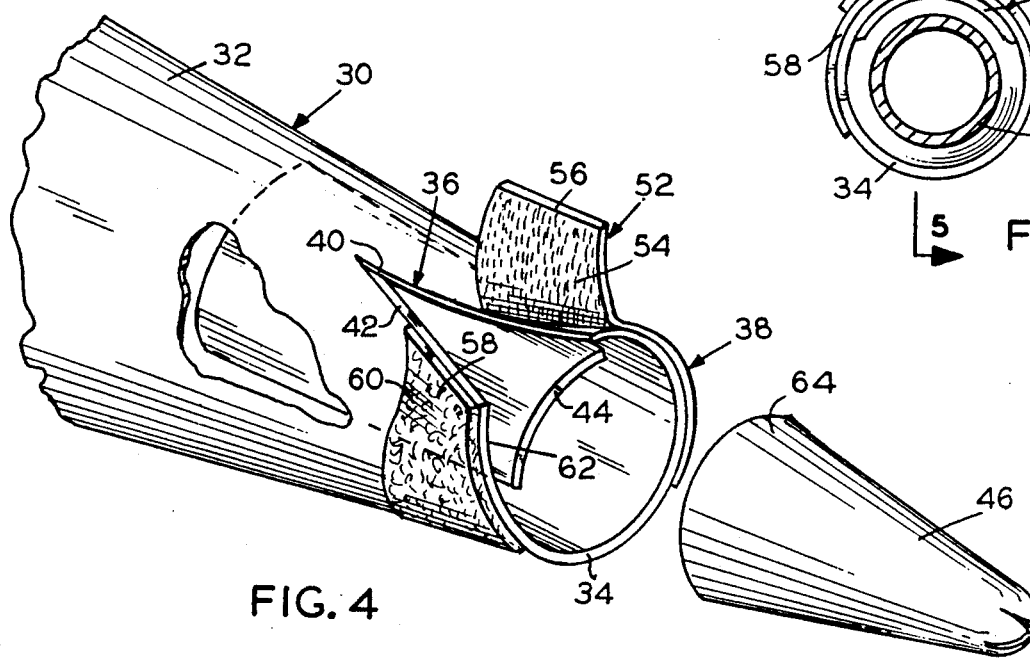
FIG. 4 illustrates an enlarged view of the open pastry bag and decorative tip of FIG. 2.
Figure 5:
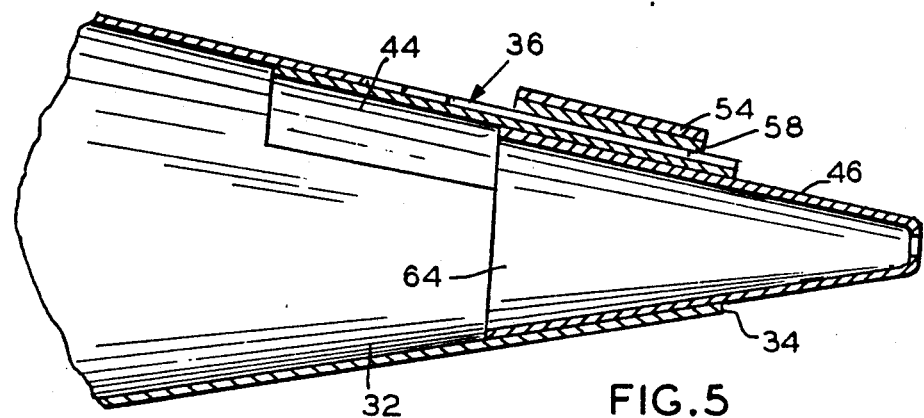
FIG. 5 illustrates a cross-sectional side view as generally seen at line 5—5 of FIG. 3.

Turning now to the drawings, there is shown in FIG. 1 a partial cross-sectional view of a conventional pastry bag 10 utilizing a tubular element 12 installed within the bag 10 having a threaded exterior surface 14 extending therefrom, upon which is engaged a threaded coupler 16. The coupler 16 has, at its outer end, an inwardly extending leg 18 which holds the decorating tip 20 against the outer surface 22 of the tubular element 12. The tubular element 12 imposes itself within the pastry bag 10, undesirably restricting the flow of icing 24 and requiring additional pressure to be applied to the pastry bag 10 during use.

Figure 6:
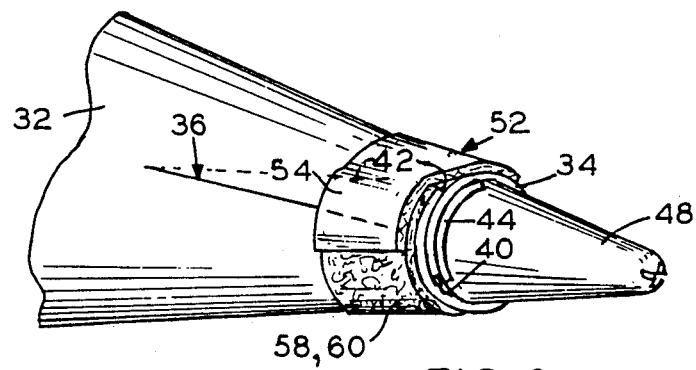
FIG. 6 illustrates a perspective view of the pastry bag holding a smaller decorative tip.
Figure 7:
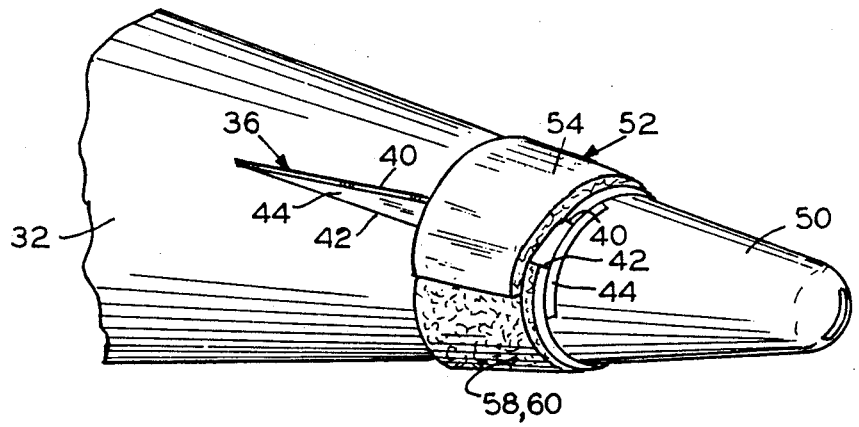
FIG. 7 illustrates a perspective view of the pastry bag holding a larger decorative tip.

FIGS. 2 through 7 illustrate the variable tip pastry bag 30 of the present invention. A flexible, conical-shaped pastry bag 32 is provided by truncation of the bag 32 at its small end 34. The bag 32 additionally is cut longitudinally from the end 34 to form a split 36 which allows the end opening 38 to be adjustable, either smaller by overlapping the split edges 40 and 42, as seen at FIG. 6, or larger by leaving the split edges 40 and 42 separated, as seen at FIG. 7. In order to prevent leakage of icing from the split 36, especially when the edges 40 and 42 are left separated, a flap 44 is attached, as by adhesive or sewing, inside of the bag 32 so that the flap 44 extends inside of, and across the opening of the split 36.

Means of adjustably fastening the edges 40 and 42 of the split 36 relative to each other are provided which allow the user to tightly fit the end opening 38 of the pastry bag 30 about a decorating tip 46, whether a smaller tip 48 (FIG. 6) or a larger tip 50 (FIG. 7), so as to engage the large end 64 of the decorating tip 46 and prevent the decorating tip 46 from exiting the end opening 38 of the pastry bag 30. A preferred means of fastening 52 includes a flexible connecting strap 54 fastened to, as by adhesive or sewing, and extending from one edge 40 of the split 36 and having a first fastening surface 56 of a hook and loop fastening means, such as marketed by the Velcro Corporation, and a connecting strap receiving means 58, such as the second fastening surface 60 of the hook and loop fastening means, positioned, as by adhesive or sewing, at an opposing position 62 on the other edge 42 of the split 36. The imposition of only the flap 44 and the decorating tip 46 within the end opening 38 of the variable tip pastry bag 30 causes only minimal restriction to the flow of icing from the bag 30.

Use of the variable tip pastry bag 30 is simple. To install a decorating tip 46, the fastening means 52 is opened and the end opening 38 spread sufficiently to allow insertion of the large end 64 of the tapering decorating tip 46 inside thereof. The flap 44 will lay on the outside of the decorating tip 46 against the split 36. The flexible connecting strap 54 then is tightly drawn so that the end opening 38 tightens and engages closely about the large end 64 of the decorating tip 46. The flexible connecting strap 54 is then engaged, as with hook and loop fastening, onto the connecting strap receiving means 58 at opposing position 62 across the split 36. Such installation of a decorating tip 46 may readily occur whether the pastry bag 30 is empty or full of icing; and the decorating tip 46 may subsequently be removed by the reverse procedure, allowing a replacement smaller or larger decorating tip 48 or 50 of the same or different icing design to be substituted therefor.

Figure 8:
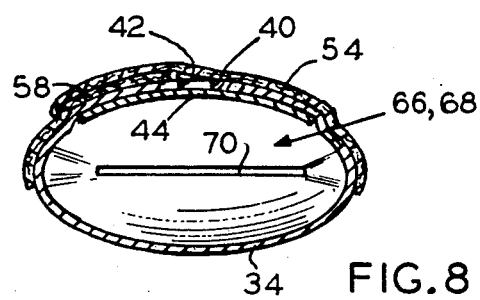
FIG. 8 illustrates an end view of the pastry bag of FIG. 2, as enclosing an alternative, non-circular shaped decorative tip.

FIG. 8 illustrates use of the variable tip pastry bag 30 with a non-circular shaped decorating tip 66. While circular decorating tips 20 must be utilized with the tubular element 12 of the illustrated prior art, the end opening 38 of the variable tip pastry bag 30, is adjustable to various shapes, such as an eliptical decorating tip 68, as shown. Such non-circular tips 66 may be advantageously designed to more closely correspond to the shape of the icing exit 70 of the tip 66.

It is thought that the variable tip pastry bag of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A variable tip pastry bag, as used to hold and apply decorative icings to cakes, pastries and the like, comprising:
    a. a flexible, conical-shaped bag having a curved surface tapering toward an apex;
    b. said bag having an end opening formed by truncation of the bag proximate the apex of the cone and by a split formed in said surface longitudinally from said end opening, the split having two opposing edges;
    c. means for adjustably fastening the edges of the split relative to each other so as to vary the size of the end opening and preclude a decorating tip from exiting said end opening; and
    d. a flap member, attached to the inside of the bag surface and formed to extend inside of and across the split so as to preclude loss of icing through the split.

2. The variable tip pastry bag, as recited in claim 1, wherein said means for adjustably fastening the edges of the split relative to each other, include:
    a. a flexible connecting strap, extending from a first edge of the split; and
    b. a connecting strap receiving means attached proximate the second and opposing edge of the split.

3. The variable tip pastry bag, as recited in claim 2, where the connecting strap has an inwardly facing surface and the connecting strap receiving means has an outwardly facing surface, there is provided on the inwardly facing surface of the connecting strap a first fastening surface of a hook and loop fastening means and there is provided on the outwardly facing surface of the connecting strap receiving means, proximate the second edge of the split, a second fastening surface of the hook and loop fastening means.

4. A variable tip pastry bag, as used to hold and apply decorative icings to cakes, pastries and the like, comprising:
    a. a flexible, conical-shaped bag having a curved surface tapering toward an apex;
    b. said bag having an end opening formed by truncation of the bag proximate the apex of the cone and by a split formed in said surface longitudinally from said end opening, the split having two opposing edges;
    c. means for adjustably fastening the edges of the split relative to each other so as to vary the size of the end opening and preclude a decorating tip from exiting said end opening, said means including:
       (1) a flexible connecting strap, having an inwardly facing surface, there being attached to said inwardly facing surface of the connecting strap a first fastening surface of a hook and loop fastening means;
       (2) a connecting strap receiving means, attached proximate the second edge of the split on the outside surface of the pastry bag, utilizing an outwardly facing second fastening surface of the hook and loop fastening means; and
    d. a flap member, attached to the inside of the bag surface and formed to extend inside of and across the split so as to preclude loss of icing through the split.

* * * * *